US012583618B2

(12) United States Patent
Peterson et al.

(10) Patent No.: US 12,583,618 B2
(45) Date of Patent: Mar. 24, 2026

(54) ENHANCED METHOD TO TROUBLESHOOT AIRCRAFT ELECTRIC POWER GENERATING SYSTEM FAULT EVENTS

(71) Applicant: Hamilton Sundstrand Corporation, Charlotte, NC (US)

(72) Inventors: Paul Peterson, Rockford, IL (US); Kamaraj Thangavelu, Rockford, IL (US); Abhay V. Munshi, Lake in the Hills, IL (US); Shashikant Vhasure, Palatine, IL (US); Mark J. Nauman, Winnebago, IL (US); Qiuming Leng, South Barrington, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 86 days.

(21) Appl. No.: 18/596,276

(22) Filed: Mar. 5, 2024

(65) Prior Publication Data

US 2025/0282494 A1 Sep. 11, 2025

(51) Int. Cl.
*B64F 5/60* (2017.01)
*B64D 45/00* (2006.01)
*G05B 23/02* (2006.01)

(52) U.S. Cl.
CPC ......... *B64D 45/00* (2013.01); *G05B 23/0264* (2013.01); *B64D 2045/0085* (2013.01)

(58) Field of Classification Search
None
See application file for complete search history.

(56) References Cited

U.S. PATENT DOCUMENTS

| | | | | |
|---|---|---|---|---|
| 7,668,632 B2 * | 2/2010 | Vian | ..................... | G07C 5/085 701/1 |
| 8,036,789 B2 * | 10/2011 | Vian | ..................... | G07C 5/085 701/31.6 |
| 8,150,815 B2 * | 4/2012 | Vian | ..................... | G07C 5/085 701/19 |
| 8,395,391 B2 | 3/2013 | Potter et al. | | |
| 10,830,808 B2 * | 11/2020 | Handy | ................. | G01R 31/327 |
| 11,035,300 B2 * | 6/2021 | Smith | ..................... | F02C 9/00 |
| 11,498,695 B2 | 11/2022 | Lee et al. | | |

(Continued)

OTHER PUBLICATIONS

37 CFR 135.152 (Year: 2021).*

*Primary Examiner* — Peter D Nolan
(74) *Attorney, Agent, or Firm* — CANTOR COLBURN LLP

(57) ABSTRACT

A fault analysis system, including: a memory device including a circular buffer, and one or more processors configured to continuously capture status signals associated with an electric power generating system of an aircraft and store the status signals to the circular buffer. The one or more processors are configured to, in response to detecting a fault event associated with the electric power generating system, store pre-fault snapshot data and fault snapshot data associated with the fault event to the memory device. The pre-fault snapshot data includes a first portion of the stored status signals corresponding to a temporal period prior to a time point associated with occurrence of the fault event. The fault snapshot data includes a second portion of the stored status signals corresponding to the time point associated with occurrence of the fault event.

17 Claims, 4 Drawing Sheets

(56) References Cited

U.S. PATENT DOCUMENTS

| 11,705,719 | B1 | 7/2023 | Munshi et al. | |
|---|---|---|---|---|
| 12,235,319 | B2 * | 2/2025 | Patil | G01R 31/318342 |
| 2006/0112119 | A1 * | 5/2006 | Vian | G07C 5/085 |
| 2010/0070445 | A1 * | 3/2010 | Vian | G07C 5/085 |
| | | | | 706/15 |
| 2010/0076630 | A1 * | 3/2010 | Vian | G07C 5/085 |
| | | | | 707/693 |
| 2013/0325366 | A1 * | 12/2013 | Rozman | H02J 1/00 |
| | | | | 702/35 |
| 2016/0207639 | A1 * | 7/2016 | Ellis | G07C 5/0808 |
| 2016/0332750 | A1 * | 11/2016 | DeRoy | B64D 13/08 |
| 2019/0011492 | A1 * | 1/2019 | Handy | G01R 31/008 |
| 2024/0393392 | A1 * | 11/2024 | Patil | G01R 31/318342 |
| 2025/0164554 | A1 * | 5/2025 | Patil | G06F 13/1668 |

* cited by examiner

Capture and Store Status Signals
405

Store Pre-Fault Snapshot Data And Fault Snapshot Data
410

Generate Fault Analysis Data
415

300

ENHANCED METHOD TO TROUBLESHOOT AIRCRAFT ELECTRIC POWER GENERATING SYSTEM FAULT EVENTS

BACKGROUND

The subject matter disclosed herein generally relates to fault events in an aircraft electric power generating system (EPGS), and more particularly to enhanced troubleshooting of aircraft EPGS fault events.

BRIEF DESCRIPTION

A fault analysis system is disclosed, including: a memory device including a circular buffer; and one or more processors configured to continuously capture status signals associated with an electric power generating system of an aircraft and store the status signals to the circular buffer; wherein in the one or more processors are configured to, in response to detecting a fault event associated with the electric power generating system, store pre-fault snapshot data and fault snapshot data associated with the fault event to the memory device, wherein: the pre-fault snapshot data includes a first portion of the stored status signals corresponding to a temporal period prior to a time point associated with occurrence of the fault event; and the fault snapshot data includes a second portion of the stored status signals corresponding to the time point associated with occurrence of the fault event.

Any one or combination of the foregoing embodiments, further including: one or more second processors configured to generate fault analysis data associated with the fault event based on processing, by the one or more second processors, the pre-fault snapshot data and the fault snapshot data.

Any one or combination of the foregoing embodiments, wherein the fault analysis data includes a rate of change associated with at least one status signal of the status signals.

Any one or combination of the foregoing embodiments, wherein the fault analysis data includes a pattern associated with at least one status signal of the status signals.

Any one or combination of the foregoing embodiments, wherein the fault analysis data includes a temporal indication of the occurrence of a fault condition and the occurrence of the fault event.

Any one or combination of the foregoing embodiments, wherein the fault analysis data includes an indication of one or more of: at least one second fault event included in the pre-fault snapshot data or the fault snapshot data, wherein the at least one second fault event is of a different type compared to the fault event; and at least one second fault condition included in the pre-fault snapshot data or the fault snapshot data, wherein the at least one second fault condition is of a different type compared to the fault condition.

Any one or combination of the foregoing embodiments, wherein the fault analysis system is configured to set the temporal period based on a type of the fault event.

Any one or combination of the foregoing embodiments, wherein the fault analysis system is configured to detect the occurrence of the fault event based on receiving a fault-confirmation signal.

A fault reporting system is disclosed, including: a memory device including a circular buffer; and one or more processors configured to continuously capture status signals associated with an electric power generating system of an aircraft and store the status signals to the circular buffer; wherein in the one or more processors are configured to, in response to detecting a fault event associated with the electric power generating system, store pre-fault snapshot data and fault snapshot data associated with the fault event to the memory device, wherein: the pre-fault snapshot data includes a first portion of the stored status signals corresponding to a temporal period prior to a time point associated with occurrence of the fault event; and the fault snapshot data includes a second portion of the stored status signals corresponding to the time point associated with occurrence of the fault event.

Any one or combination of the foregoing embodiments, wherein the fault reporting system is configured to provide the pre-fault snapshot data and the fault snapshot data in association with generating fault analysis data associated with the fault event.

Any one or combination of the foregoing embodiments, wherein the fault reporting system is configured to set the temporal period based on a type of the fault event.

Any one or combination of the foregoing embodiments, wherein the fault reporting system is configured to detect the occurrence of the fault event based on receiving a fault-confirmation signal.

A method is disclosed, including: continuously capturing, by one or more processors, status signals associated with an electric power generating system of an aircraft and storing the status signals to a circular buffer; and in response to detecting a fault event associated with the electric power generating system, storing pre-fault snapshot data and fault snapshot data associated with the fault event to a memory device, wherein: the pre-fault snapshot data includes a first portion of the stored status signals corresponding to a temporal period prior to a time point associated with occurrence of the fault event; and the fault snapshot data includes a second portion of the stored status signals corresponding to the time point associated with occurrence of the fault event.

Any one or combination of the foregoing embodiments, further including: generating fault analysis data associated with the fault event based on processing, by a computing device, the pre-fault snapshot data and the fault snapshot data.

Any one or combination of the foregoing embodiments, wherein the fault analysis data includes a rate of change associated with at least one status signal of the status signals.

Any one or combination of the foregoing embodiments, wherein the fault analysis data includes a pattern associated with at least one status signal of the status signals.

Any one or combination of the foregoing embodiments, wherein the fault analysis data includes a temporal indication of the occurrence of a fault condition and the occurrence of the fault event.

Any one or combination of the foregoing embodiments, wherein the fault analysis data includes an indication of one or more of: at least one second fault event included in the pre-fault snapshot data or the fault snapshot data, wherein the at least one second fault event is of a different type compared to the fault event; and at least one second fault condition included in the pre-fault snapshot data or the fault snapshot data, wherein the at least one second fault condition is of a different type compared to the fault condition.

Any one or combination of the foregoing embodiments, further including setting the temporal period based on a type of the fault event.

Any one or combination of the foregoing embodiments, wherein detecting the occurrence of the fault event is based on receiving a fault-confirmation signal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
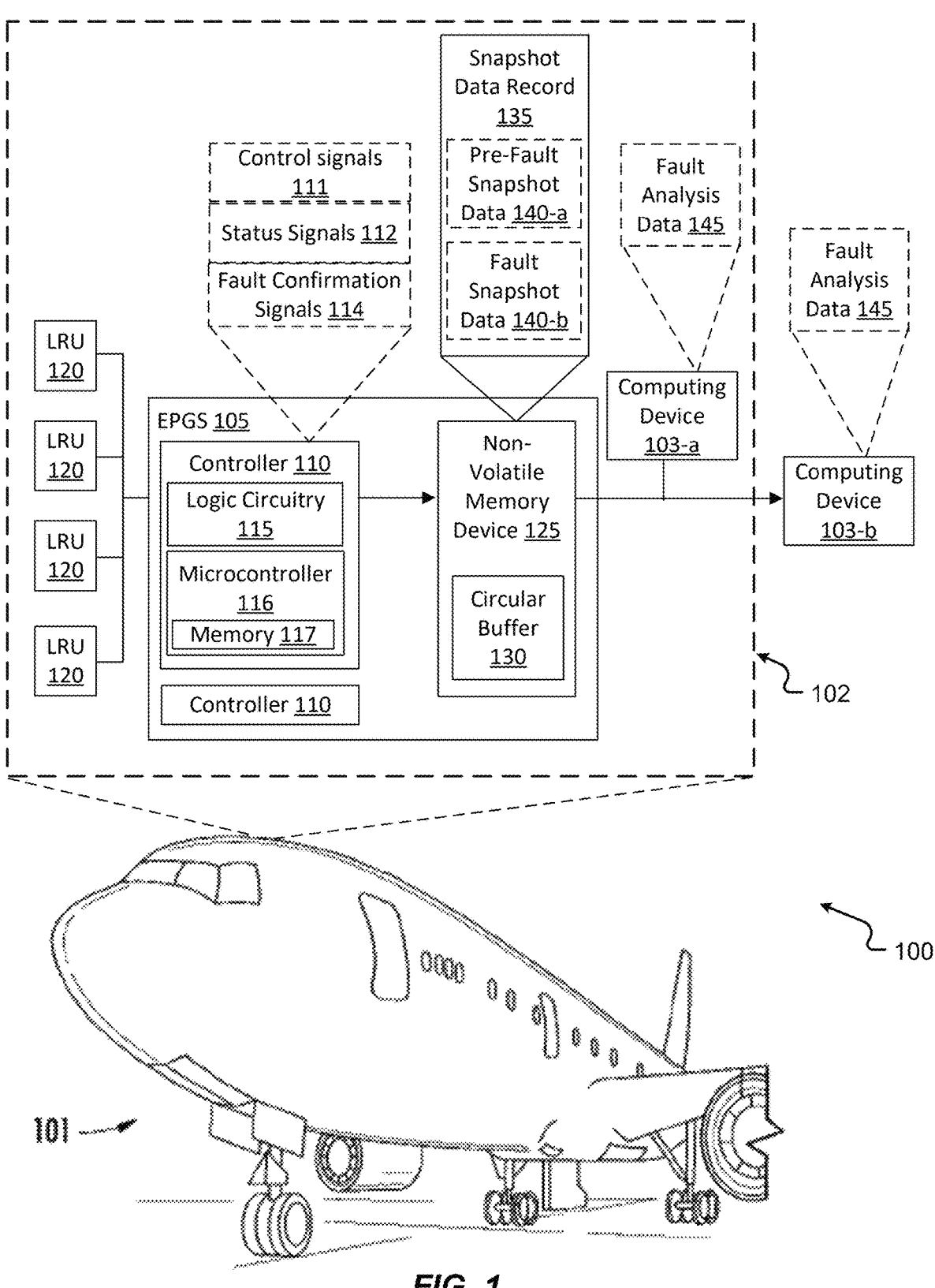
FIG. 1 is a schematic illustration of a system that can incorporate various embodiments of the present disclosure.

FIG. 1 is a schematic illustration of a system 100 that can incorporate various embodiments of the present disclosure. As shown in FIG. 1, the system 100 may include an aircraft 101 and one or more computing devices 103.

The computing devices 103 may be capable of performing any combination of operations described herein. In some cases, the system 100 may include computing devices 103 internal to and integrated with the aircraft system 102 and computing devices 103 separate from the aircraft system 102. Components of the aircraft system 102 described herein may be electrically coupled via any combination of buses (not illustrated) (e.g., power buses, data buses, avionics buses, or the like).

A computing device 103 (e.g., computing device 103-*a*, computing device 103-*b*) may be disposed in operable communication with components of the aircraft 101. The system 100 and aircraft system 102 supports communication between the computing devices 103 and other devices of the system 100 via wired communication protocols, wireless communication protocols (e.g., electromagnetic (EM) signals, WiFi, Bluetooth™, ZigBee™, Ubiquiti™, 3G, 4G, LTE, and the like), and/or combinations including one or more of the foregoing.

The computing device 103 is configured to receive, store and/or transmit data. The computing device 103 includes processing components configured to analyze received signals and data described herein. The computing device 103 includes processing components configured to provide data (and/or control signals) to other components of the system 100 or aircraft system 102. The computing device 103 includes any number of suitable components, such as processors, memory, communication devices and power sources.

The computing device 103 may include processing circuitry capable of executing instructions stored on a memory of the computing device 103 in association with performing one or more functions described herein. Some elements stored in the memory may be described as or referred to as instructions or instruction sets, and some functions of the computing device 103 may be implemented using machine learning techniques.

The aircraft 101 can include an EPGS 105. The EPGS 105 may include an EPGS controller 110. In some examples, logic circuitry 115 may be implemented in the EPGS controller 110. The logic circuitry 115 may be, for example, built-in test equipment (BITE) logic. In some embodiments, the EPGS 105 may include multiple EPGS controllers 110. It is to be understood that aspects described herein with reference to a EPGS controller 110 may be applied to other EPGS controllers 110 included in the EPGS 105.

The EPGS controller 110 may include microcontroller 116 (or multiple microcontrollers 116). The microcontroller 116 may correspond to one or many computer processing devices. For example, the 116 may include a silicon chip, such as a FPGA, an ASIC, any other type of IC chip, a collection of IC chips, or the like. In some aspects, the processors may include a microprocessor, CPU, a GPU, or plurality of microprocessors configured to execute the instructions sets stored in a corresponding memory (e.g., memory 117 of the microcontroller 116). For example, upon executing the instruction sets stored in memory 117, the microcontroller 116 may enable or perform one or more functions described herein. Some elements stored in memory 117 may be described as or referred to as instructions or instruction sets.

The memory 117 may include one or multiple computer memory devices. The memory 117 may include, for example, Random Access Memory (RAM) devices, Read Only Memory (ROM) devices, flash memory devices, magnetic disk storage media, optical storage media, solid state storage devices, core memory, buffer memory devices, combinations thereof, and the like. The memory 117, in some examples, may correspond to a computer readable storage media. In some aspects, the memory 117 may be internal or external to the EPGS controller 110 and/or the microcontroller 116.

The memory 117 may be configured to store instruction sets and other data structures (e.g., depicted herein) in addition to temporarily storing data for the microcontroller 116 to execute various types of routines or functions. For example, the memory 117 may be configured to store program instructions (instruction sets) that are executable by the microcontroller 116 and provide functionality of the EPGS controller 110 described herein. The memory 117 may also be configured to store data or information that is useable or capable of being called by the instructions stored in memory 117.

The aircraft 101 may include multiple line replaceable units (LRUs) 120 electrically coupled to the EPGS 105. The LRUs 120 may be coupled to the EPGS 105 via one or more data buses. Non-limiting examples of the LRUs 120 include generators, contactors, controllers, switches, wiring, sensors, and the like.

The EPGS 105 may include a non-volatile memory (NVM) device 125 capable of storing data. Aspects of the present disclosure include implementing a circular buffer 130 in the NVM device 125. The circular buffer 130 (also referred to herein as a circular queue, a cyclic buffer, or a ring buffer) is a data structure that uses a single buffer as if the buffer were connected end-to-end. The size of the circular buffer 130 may be a fixed size or may be tunable by the system 100.

The circular buffer 130 may have a predetermined storage space. In some cases, the circular buffer 130 may be capable of continuously storing data. For example, a property of the circular buffer 130 is that when the circular buffer 130 is full and a subsequent writing of data to the circular buffer 130 is performed, the data write may overwrite the oldest data stored on the circular buffer 130. In some aspects, the techniques described herein include setting the storage space of the circular buffer 130 based on one or more criteria.

According to one or more embodiments of the present disclosure, the system 100 supports enhanced techniques of capturing and storing information relevant to a fault event associated with the EPGS 105 of the aircraft 101. The techniques described herein provide data (snapshot data record 135 later described herein) supportive of improving the accuracy and efficiency of field service engineering and product engineering analyses when an aircraft event is reported.

According to one or more embodiments of the present disclosure, in response to a fault event at the aircraft 101 (e.g., at a LRU 120), the EPGS controller 110 may isolate the reason for the fault event to the most relevant LRU 120 in the aircraft system 102. In some examples, the fault event may be due to one or more fault conditions, example aspects of which are later described herein.

In an example, circuitry in the EPGS controller 110 may provide control signals 111 to microcontroller 116 to consume. For example, the EPGS controller 110 provides, in digital form (e.g., control signals 111), conditions of switches and measurement data (e.g., temperatures, pressures, and the like) to microcontroller 116 to consume. Based on the control signals 111, the microcontroller 116 may produce status signals 112.

The EPGS controller 110 (processor) may act on the status signals 112 to determine whether a fault condition is present. For example, the EPGS controller 110 (e.g., using logic circuitry 115) may generate and output a fault-confirmation signal 114 indicating the presence of the fault condition. That is, for example, the EPGS controller 110 may generate a fault code (e.g., a fault-confirmation signal 114) for confirming the fault event. In an example, a fault event may include a generator failure associated with the aircraft system 102, but is not limited thereto.

Non-limiting examples of the status signals 112 include voltages, currents, frequencies, temperatures, internal controller statuses, switches, contactors, and the like. The aircraft system 102 (e.g., at EPGS controller 110) may store, to snapshot data record 135, fault snapshot data 140-*b* (inclusive of the status signals 112) and an associated isolated fault code to the NVM device 125 for engineering investigation support. For example, the snapshot data record 135 and fault snapshot data 140-*b* may support post-event analysis in accordance with example aspects of the present disclosure.

In accordance with one or more embodiments of the present disclosure, the EPGS 105 may be capable of providing pre-fault snapshot data 140-*a* and fault snapshot data 140-*b* supportive of post-event analysis (e.g., post fault event). In an example, the EPGS 105 (e.g., at EPGS controller 110) may continuously capture the same status signals 112 (e.g., input and output signals) and store the status signals 112 to circular buffer 130.

In the event of a detected fault, the aircraft system 102 may provide a portion of the status signals 112 (stored in the circular buffer 130) to the snapshot data record 135 as pre-fault snapshot data 140-*a*. For example, in response to a fault-confirmation signal 114 generated by the EPGS 105 (e.g., at microcontroller 116), the EPGS 105 may further generate the pre-fault snapshot data 140-*a*. In some embodiments, the EPGS 105 may provide the status signals 112 for a target temporal period (e.g., temporal period 232 later described herein with reference to FIG. 2) prior to the fault event, based on a type or classification of the fault event.

In some embodiments, the EPGS 105 may be capable of providing pre-fault snapshot data 140-*a* and fault snapshot data 140-*b*, along with the fault-confirmation signal 114 (or multiple fault-confirmation signals 114) in the snapshot data record 135 associated with a given fault event. Accordingly, for example, the further inclusion of the pre-event (pre-trigger) status signals included in the pre-fault snapshot data 140-*a* support enhanced post-event engineering analysis of a fault by providing additional insight into the status of the generating channel/system leading up to the fault confirmation.

For example, the EPGS 105 may provide the snapshot data record 135 to a computing device 103 (e.g., computing device 103-*a*, computing device 103-*b*, example aspects of which are described herein). Based on the pre-fault snapshot data 140-*a* and the fault snapshot data 140-*b* included in the snapshot data record 135, the computing device 103 may generate fault analysis data 145 (also referred to herein as insight data) of factors leading up to the fault confirmation. Non-limiting examples of the fault analysis data 145 include a rate of change in voltage, a rate of change in frequency, a rate of change in temperature, and the like.

Figure 2:
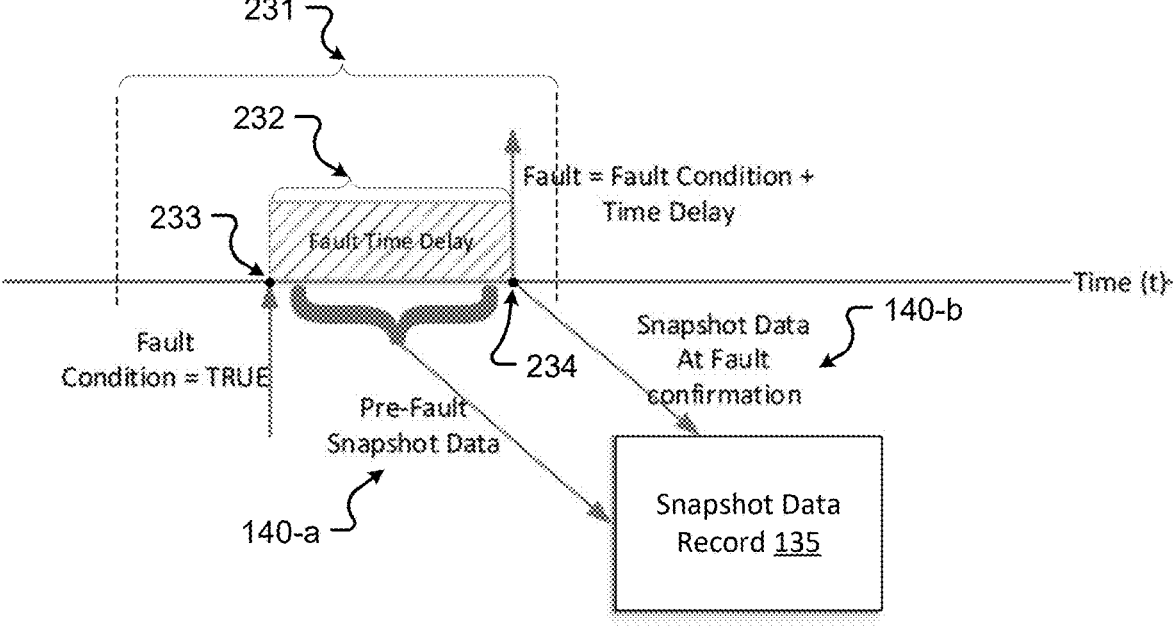
FIG. 2 is an example timeline supportive of enhanced troubleshooting of aircraft fault events in accordance with example aspects of the present disclosure.
Figure 2:

FIG. 2 is an example timeline 200 supportive of enhanced troubleshooting of aircraft EPGS fault events in accordance with example aspects of the present disclosure. The timeline 200 illustrates aspects of storing pre-fault snapshot data 140-*a* and fault snapshot data 140-*b* to a snapshot data record 135 (also referred to herein as a BITE fault record) in response to confirmation of a fault event. Aspects of the timeline 200 of FIG. 2 will be described herein with reference to the system 100 of FIG. 1.

According to one or more embodiments of the present disclosure, the system 100 may support fault reporting by the aircraft system 102 and fault analysis by computing device 103-*a* (e.g., a central maintenance computer included in the aircraft system 102) or computing device 103-*b* (e.g., based on data provided by the aircraft system 102).

In some examples, in response to detection of a fault event, the EPGS 105 is configured to store pre-fault snapshot data 140-*a* and fault snapshot data 140-*b* associated with the fault event to the memory device 125. In some examples, the fault event may be based on a fault code (e.g., a fault-confirmation signal 114) generated by the EPGS 105. In an example with reference to FIG. 2, the fault event may occur and the EPGS 105 may generate the fault-confirmation signal 114 at time point 234 due to a fault condition at time point 233 and/or one or more conditions ranging from time point 233 to time point 234.

In some embodiments, the pre-fault snapshot data 140-*a* includes a first portion of the stored status signals 112 corresponding to a temporal period 232 (also referred to herein as a fault time delay) prior to a time point 234 associated with occurrence of the fault event. For example, the first portion of the stored status signals 112 may include status signals 112 collected during the temporal period 232 ranging from time point 233 to time point 234.

In some embodiments, the fault snapshot data 140-*b* includes a second portion of the stored status signals 112 corresponding to the time point 234 associated with occurrence of the fault event. For example, the first portion of the stored status signals 112 may include status signals 112 collected at the time point 234 or at about the time point 234 (e.g., +/−a temporal amount with respect to the time point 234).

In some embodiments, the computing devices 103 (computing device 103-*a*, computing device 103-*b* are configured to generate fault analysis data 145 associated with the fault event. For example, the computing devices 103 are configured to generate the fault analysis data 145 based on processing the pre-fault snapshot data 140-*a* and the fault snapshot data 140-*b*. Aspects of the present disclosure support generating the fault analysis data 145 autonomously and/or semi-autonomously.

In some embodiments, the aircraft system 102 may transmit the snapshot data record 135 (e.g., pre-fault snapshot data 140-*a* and fault snapshot data 140-*b*) to the computing device 103-*b*. In a non-limiting example, the snapshot data record 135 may include an indication of an overvoltage condition due to one or more factors.

In some other embodiments, the system 100 supports transferring (e.g., via data transmission) the snapshot data record 135 from the aircraft system 102 to the computing device 103-*b* via electrical coupling to the NVM device 125 or electrical coupling to another suitable removable memory storage device on which the snapshot data record 135 may be stored. For example, the system 100 supports data dumps of raw unfiltered data from the aircraft system 102 to the computing device 103-*b*, based on which the computing device 103-*b* may generate the fault analysis data 145.

In some examples, the fault analysis data 145 includes a rate of change associated with at least one status signal 112 of the status signals 112. In some examples, the fault analysis data 145 includes a pattern associated with at least one status signal 112 of the status signals 112. For example, the fault analysis data 145 may include a rate of change or a pattern associated with a voltage, a current, a frequency, a temperature, an internal controller status, a state of a switch, or the like of one or more of the LRUs 120.

In some embodiments, the fault analysis data 145 may include a correlation between one or more conditions or events (e.g., as determined by a computing device 103 from associated status signals 112) included in the temporal period 232 to the detected fault event. For example, the fault analysis data 145 may include insight into the status of a given component (e.g., LRU 120) of the aircraft system 102 leading up to a fault confirmation signal 114. Accordingly, for example, the techniques described herein provide more effective and more accurate insight of the cause of a fault event compared to other techniques which fail to incorporate pre-fault snapshot data 140-*a* into fault analysis.

In some examples, the fault analysis data 145 includes a temporal indication of the occurrence of the fault condition and the occurrence of the fault event. For example, the temporal indication may include the time point 233, the time point 234, and/or a difference value between the time point 233.

In some examples, the fault analysis data 145 includes an indication of at least one second fault event included in the pre-fault snapshot data 140-*a* or the fault snapshot data 140-*b*, wherein the at least one second fault event is of a different type compared to the fault event. In some examples, the fault analysis data 145 includes an indication of at least one second fault condition included in the pre-fault snapshot data 140-*a* or the fault snapshot data 140-*b*, wherein the at least one second fault condition is of a different type compared to the fault condition.

In some embodiments, the system 100 is configured to set or tune the temporal period 232 based on a type of the fault event. For example, the computing device 103 (e.g., computing device 103-*a*, computing device 103-*b*) may determine the type of the fault event based on a corresponding fault code (e.g., fault-confirmation signal 114) generated by the EPGS 105. Based on the type of the fault event, the computing device 103 may set the temporal period 232 for the pre-fault snapshot data 140-*a* and assess, in the pre-fault snapshot data 140-*a*, status signals 112 included in the temporal period 232. Accordingly, for example, aspects of the present disclosure support configuring the temporal period 232 for assessing or determining a target type of fault.

Additionally, or alternatively, the computing device 103 may assess, in the snapshot data record 135, all status signals 112 included in temporal period 231. Based on the type of the fault event, the computing device 103 may process and analyze, from the temporal period 231, status signals 112 included in the temporal period 232 and status signals 112 outside the temporal period 232. It is to be understood that in the examples described herein, the temporal period 232 may include time point 233 and time point 234, or alternatively, may be separate from time point 234.

Figure 3:
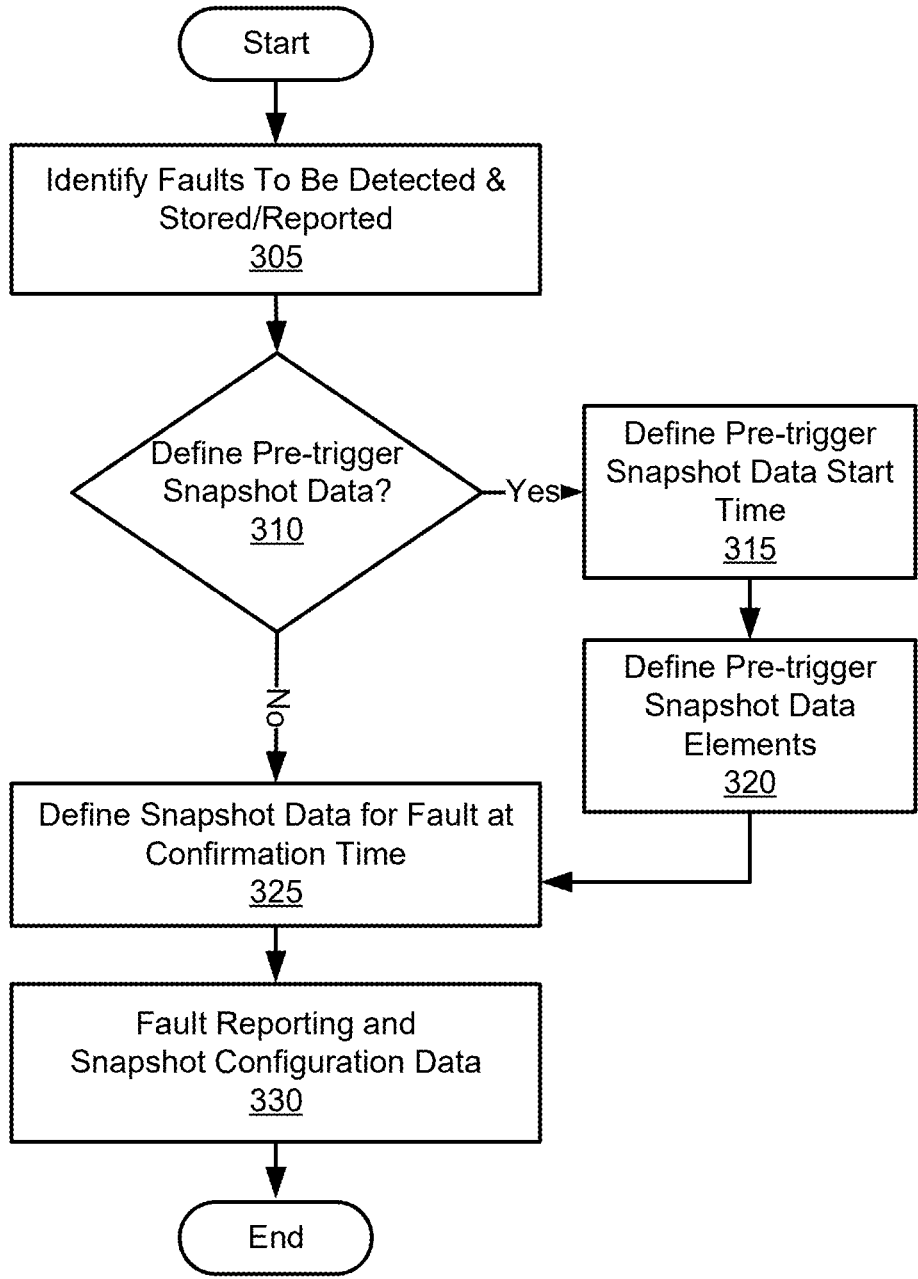
FIG. 3 illustrates an example flowchart of a method that supports enhanced troubleshooting of aircraft fault events in accordance with one or more embodiments of the present disclosure.

FIG. 3 illustrates an example flowchart of a method 300 that supports enhanced troubleshooting of aircraft EPGS fault events in accordance with one or more embodiments of the present disclosure. The method 300 may be implemented by aircraft system 102 and/or a computing device 103 described with reference to FIG. 1.

At 305, the method 300 includes identifying faults to be detected and stored/reported.

At 310, the method 300 includes determining whether to define pre-trigger snapshot data (e.g., pre-fault snapshot data 140-*a* described herein). For example, at 310, the method 300 may include determining whether pre-trigger snapshot data is beneficial for fault analysis. For 'Yes', the method 300 may include proceeding to 315. For 'No,' the method 300 may include proceeding to 325.

At 315, the method 300 may include defining a start time for the pre-trigger snapshot data (e.g., a start time point for temporal period 232 described herein).

At 320, the method 300 may include defining pre-trigger snapshot data elements (e.g., status signals 112 and associated components of the aircraft system 102 (for example, LRUs 120) to include in pre-fault snapshot data 140-*a* and/or fault snapshot data 140-*b*). In some aspects, at 320, the method 300 may include storing the pre-trigger snapshot data elements (e.g., pre-fault snapshot data 140-*a*) to a data record (e.g., snapshot data record 135) as described herein.

At 325, the method 300 may include defining snapshot data (e.g., fault snapshot data 140-*b*) for fault at confirmation time. In some aspects, at 325, the method 300 may include storing the snapshot data to a data record (e.g., snapshot data record 135) as described herein.

At 330, the method 300 may include generating fault reporting and snapshot configuration data (e.g., fault analysis data 145 described herein).

Figure 4:
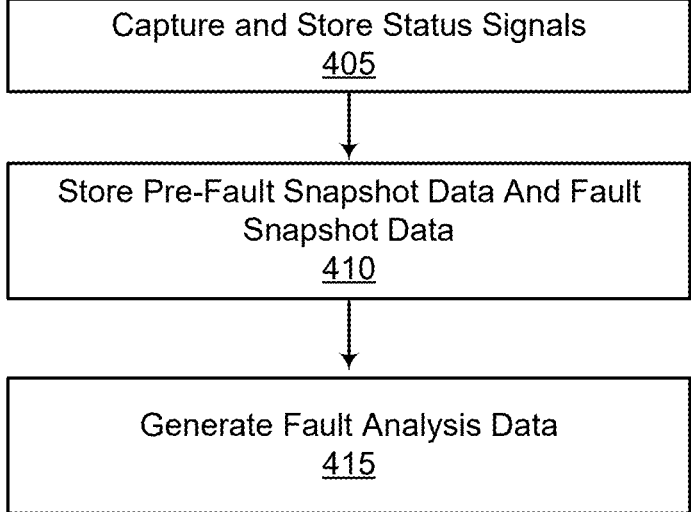
FIG. 4 illustrates an example flowchart of a method that supports enhanced troubleshooting of aircraft fault events in accordance with one or more embodiments of the present disclosure.
Figure 4:
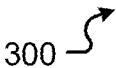

FIG. 4 illustrates an example flowchart of a method 400 that supports enhanced troubleshooting of aircraft EPGS fault events in accordance with one or more embodiments of the present disclosure. The method 400 may be implemented by aircraft system 102 and/or a computing device 103 described with reference to FIG. 1.

At 405, the method 400 includes continuously capturing, by one or more processors, status signals associated with an electric power generating system of an aircraft and storing the status signals to a circular buffer.

At 410, the method 400 includes, in response to detecting a fault event associated with the electric power generating system, storing pre-fault snapshot data and fault snapshot data associated with the fault event to a memory device.

In some aspects, detecting the occurrence of the fault event is based on receiving a fault-confirmation signal.

In some aspects, the pre-fault snapshot data includes a first portion of the stored status signals corresponding to a temporal period prior to a time point associated with occurrence of the fault event. In some aspects, the fault snapshot data includes a second portion of the stored status signals corresponding to the time point associated with occurrence of the fault event.

In some aspects, the method 400 includes setting the temporal period based on a type of the fault event.

At 415, the method 400 includes generating fault analysis data associated with the fault event based on processing, by a computing device, the pre-fault snapshot data and the fault snapshot data.

In some aspects, the fault analysis data includes a rate of change associated with at least one status signal of the status signals.

In some aspects, the fault analysis data includes a pattern associated with at least one status signal of the status signals.

In some aspects, the fault analysis data includes a temporal indication of the occurrence of a fault condition and the occurrence of the fault event.

In some aspects, the fault analysis data includes an indication of one or more of: at least one second fault event included in the pre-fault snapshot data or the fault snapshot data, where the at least one second fault event is of a different type compared to the fault event; and at least one second fault condition included in the pre-fault snapshot data or the fault snapshot data, where the at least one second fault condition is of a different type compared to the fault condition.

In the descriptions of the flowcharts herein, the operations may be performed in a different order than the order shown, or the operations may be performed in different orders or at different times. Certain operations may also be left out of the flowcharts, one or more operations may be repeated, or other operations may be added to the flowcharts.

Set forth are embodiments supported by the present disclosure.

Embodiment 1. A fault analysis system, comprising: a memory device comprising a circular buffer; and one or more processors configured to continuously capture status signals associated with an electric power generating system of an aircraft and store the status signals to the circular buffer; wherein in the one or more processors are configured to, in response to detecting a fault event associated with the electric power generating system, store pre-fault snapshot data and fault snapshot data associated with the fault event to the memory device, wherein: the pre-fault snapshot data comprises a first portion of the stored status signals corresponding to a temporal period prior to a time point associated with occurrence of the fault event; and the fault snapshot data comprises a second portion of the stored status signals corresponding to the time point associated with occurrence of the fault event.

Embodiment 2. The fault analysis system of Embodiment 1, further comprising: one or more second processors configured to generate fault analysis data associated with the fault event based on processing, by the one or more second processors, the pre-fault snapshot data and the fault snapshot data.

Embodiment 3. The fault analysis system of any of Embodiments 1 or 2, wherein the fault analysis data comprises a rate of change associated with at least one status signal of the status signals.

Embodiment 4. The fault analysis system of any of Embodiments 1 through 3, wherein the fault analysis data comprises a pattern associated with at least one status signal of the status signals.

Embodiment 5. The fault analysis system of any of Embodiments 1 through 4, wherein the fault analysis data comprises a temporal indication of the occurrence of a fault condition and the occurrence of the fault event.

Embodiment 6. The fault analysis system of any of Embodiments 1 through 5, wherein the fault analysis data comprises an indication of one or more of: at least one second fault event included in the pre-fault snapshot data or the fault snapshot data, wherein the at least one second fault event is of a different type compared to the fault event; and at least one second fault condition included in the pre-fault snapshot data or the fault snapshot data, wherein the at least one second fault condition is of a different type compared to the fault condition.

Embodiment 7. The fault analysis system of any of Embodiments 1 through 6, wherein the fault analysis system is configured to set the temporal period based on a type of the fault event.

Embodiment 8. The fault analysis system of any of Embodiments 1 through 7, wherein the fault analysis system is configured to detect the occurrence of the fault event based on receiving a fault-confirmation signal.

Embodiment 9. A fault reporting system, comprising: a memory device comprising a circular buffer; and one or more processors configured to continuously capture status signals associated with an electric power generating system of an aircraft and store the status signals to the circular buffer; wherein in the one or more processors are configured to, in response to detecting a fault event associated with the electric power generating system, store pre-fault snapshot data and fault snapshot data associated with the fault event to the memory device, wherein: the pre-fault snapshot data comprises a first portion of the stored status signals corresponding to a temporal period prior to a time point associated with occurrence of the fault event; and the fault snapshot data comprises a second portion of the stored status signals corresponding to the time point associated with occurrence of the fault event.

Embodiment 10. The fault reporting system of Embodiment 9, wherein the fault reporting system is configured to provide the pre-fault snapshot data and the fault snapshot data in association with generating fault analysis data associated with the fault event.

Embodiment 11. The fault reporting system of any of Embodiments 9 or 10, wherein the fault reporting system is configured to set the temporal period based on a type of the fault event.

Embodiment 12. The fault reporting system of any of Embodiments 9 through 11, wherein the fault reporting system is configured to detect the occurrence of the fault event based on receiving a fault-confirmation signal.

Embodiment 13. A method comprising: continuously capturing, by one or more processors, status signals associated with an electric power generating system of an aircraft and storing the status signals to a circular buffer; and in response to detecting a fault event associated with the electric power generating system, storing pre-fault snapshot data and fault snapshot data associated with the fault event to a memory device, wherein: the pre-fault snapshot data comprises a first portion of the stored status signals corresponding to a temporal period prior to a time point associated with occurrence of the fault event; and the fault snapshot data comprises a second portion of the stored status signals corresponding to the time point associated with occurrence of the fault event.

Embodiment 14. The method of Embodiment 13, further comprising: generating fault analysis data associated with the fault event based on processing, by a computing device, the pre-fault snapshot data and the fault snapshot data.

Embodiment 15. The method of any of Embodiments 13 or 14, wherein the fault analysis data comprises a rate of change associated with at least one status signal of the status signals.

Embodiment 16. The method of any of Embodiments 13 through 15, wherein the fault analysis data comprises a pattern associated with at least one status signal of the status signals.

Embodiment 17. The method of any of Embodiments 13 through 16, wherein the fault analysis data comprises a temporal indication of the occurrence of a fault condition and the occurrence of the fault event.

Embodiment 18. The method of any of Embodiments 13 through 17, wherein the fault analysis data comprises an indication of one or more of: at least one second fault event included in the pre-fault snapshot data or the fault snapshot data, wherein the at least one second fault event is of a different type compared to the fault event; and at least one second fault condition included in the pre-fault snapshot data or the fault snapshot data, wherein the at least one second fault condition is of a different type compared to the fault condition.

Embodiment 19. The method of any of Embodiments 13 through 18, further comprising setting the temporal period based on a type of the fault event.

Embodiment 20. The method of any of Embodiments 13 through 19, wherein detecting the occurrence of the fault event is based on receiving a fault-confirmation signal.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/implementations in combination with any one or more other aspects/features/implementations.

Use of any one or more of the aspects or features as disclosed herein.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fault analysis system, comprising:

a memory device comprising a circular buffer; and one or more processors configured to continuously capture status signals associated with an electric power generating system of an aircraft and store the status signals to the circular buffer;

wherein in the one or more processors are configured to, in response to detecting a fault event associated with the electric power generating system, store pre-fault snapshot data and fault snapshot data associated with the fault event to the memory device, wherein:

the pre-fault snapshot data comprises a first portion of the stored status signals corresponding to a temporal period prior to a time point associated with occurrence of the fault event; and the fault snapshot data comprises a second portion of the stored status signals corresponding to the time point associated with occurrence of the fault event, wherein the fault analysis system is configured to set the temporal period based on a type of the fault event.

2. The fault analysis system of claim 1, further comprising:

one or more second processors configured to generate fault analysis data associated with the fault event based on processing, by the one or more second processors, the pre-fault snapshot data and the fault snapshot data.

3. The fault analysis system of claim 2, wherein the fault analysis data comprises a rate of change associated with at least one status signal of the status signals.

4. The fault analysis system of claim 2, wherein the fault analysis data comprises a pattern associated with at least one status signal of the status signals.

5. The fault analysis system of claim 2, wherein the fault analysis data comprises a temporal indication of the occurrence of a fault condition and the occurrence of the fault event.

6. The fault analysis system of claim 2, wherein the fault analysis data comprises an indication of one or more of:

at least one second fault event included in the pre-fault snapshot data or the fault snapshot data, wherein the at least one second fault event is of a different type compared to the fault event; and at least one second fault condition included in the pre-fault snapshot data or the fault snapshot data, wherein the at least one second fault condition is of a different type compared to the fault condition.

7. The fault analysis system of claim 1, wherein the fault analysis system is configured to detect the occurrence of the fault event based on receiving a fault-confirmation signal.

8. A fault reporting system, comprising:

a memory device comprising a circular buffer; and one or more processors configured to continuously capture status signals associated with an electric power generating system of an aircraft and store the status signals to the circular buffer;

wherein the one or more processors are configured to, in response to detecting a fault event associated with the electric power generating system, store pre-fault snapshot data and fault snapshot data associated with the fault event to the memory device, wherein:

the pre-fault snapshot data comprises a first portion of the stored status signals corresponding to a temporal period prior to a time point associated with occurrence of the fault event; and the fault snapshot data comprises a second portion of the stored status signals corresponding to the time point associated with occurrence of the fault event, wherein the fault reporting system is configured to set the temporal period based on a fault code corresponding to the fault event.

9. The fault reporting system of claim 8, wherein the fault reporting system is configured to provide the pre-fault snapshot data and the fault snapshot data in association with generating fault analysis data associated with the fault event.

10. The fault reporting system of claim 8, wherein the fault reporting system is configured to detect the occurrence of the fault event based on receiving a fault-confirmation signal.

11. A method comprising:

continuously capturing, by one or more processors, status signals associated with an electric power generating system of an aircraft and storing the status signals to a circular buffer; and in response to detecting a fault event associated with the electric power generating system;

setting a temporal period with respect to storing pre-fault snapshot data associated with the fault event, based on a type of the fault event; and storing the pre-fault snapshot data associated with the fault event and fault snapshot data associated with the fault event to a memory device, wherein:

the pre-fault snapshot data comprises a first portion of the stored status signals corresponding to the temporal period, and the temporal period is prior to a time point associated with occurrence of the fault event; and the fault snapshot data comprises a second portion of the stored status signals corresponding to the time point associated with occurrence of the fault event.

12. The method of claim 11, further comprising:

generating fault analysis data associated with the fault event based on processing, by a computing device, the pre-fault snapshot data and the fault snapshot data.

13. The method of claim 12, wherein the fault analysis data comprises a rate of change associated with at least one status signal of the status signals.

14. The method of claim 12, wherein the fault analysis data comprises a pattern associated with at least one status signal of the status signals.

15. The method of claim 12, wherein the fault analysis data comprises a temporal indication of the occurrence of a fault condition and the occurrence of the fault event.

16. The method of claim 12, wherein the fault analysis data comprises an indication of one or more of:

at least one second fault event included in the pre-fault snapshot data or the fault snapshot data, wherein the at least one second fault event is of a different type compared to the fault event; and at least one second fault condition included in the pre-fault snapshot data or the fault snapshot data, wherein the at least one second fault condition is of a different type compared to the fault condition.

17. The method of claim 12, wherein detecting the occurrence of the fault event is based on receiving a fault-confirmation signal.

* * * * *